United States Patent [19]

Zhov

[11] Patent Number: 5,725,345
[45] Date of Patent: Mar. 10, 1998

[54] TIRE REPAIR SCREW WITH SEALING MATERIAL

[76] Inventor: Peng Zhov, 14802 Millicent Ct., Centreville, Va. 22020

[21] Appl. No.: 602,000

[22] Filed: Feb. 15, 1996

Related U.S. Application Data

[63] Continuation-in-part of Ser. No. 312,227, Sep. 26, 1994, Pat. No. 5,494,391.

[51] Int. Cl.$^6$ ............................ F16B 33/00; F16B 43/02
[52] U.S. Cl. ..................... 411/369; 411/542; 411/915
[58] Field of Search ........................ 411/82, 258, 369, 411/542, 915, 930

[56] References Cited

U.S. PATENT DOCUMENTS

| | | | |
|---|---|---|---|
| 887,962 | 5/1908 | Reisner | 411/369 X |
| 951,437 | 3/1910 | Gehrke | 411/369 X |
| 3,247,752 | 4/1966 | Greenleaf et al. | 411/542 |
| 3,469,490 | 9/1969 | Pearce, Jr. | 411/369 X |
| 4,657,460 | 4/1987 | Bien | 411/915 X |
| 4,875,818 | 10/1989 | Reinwall | 411/369 |

*Primary Examiner*—Neill R. Wilson
*Attorney, Agent, or Firm*—Jones, Tullar & Cooper, P.C.

[57] ABSTRACT

A very simple and economic method for quickly repairing a puncture in a vehicle tire utilizes a screw having a concave slot beneath its head, with the circumference of the head portion cooperating with the slot to provide an edge which slightly cuts into the surface of the tire when the screw is inserted into the puncture. A sealing material such as an adhesive rubber is placed in the slot and seals the top of the puncture when the screw is threaded into the puncture hole. The design provides easy, quick, efficient and very low cost repairs for a puncture in a tire, not only for temporary repairs but for long term repairs. The design is simple and includes only two parts: a screw having a spiral thread by which the screw is affixed in the tire, and a concave slot under the screw head with the sealing material such as an adhesive or sticky rubber which is secured in the slot. The screw body is fixed in the tire hole and the head presses the sealing material into the hole.

2 Claims, 2 Drawing Sheets

TIRE REPAIR SCREW WITH SEALING MATERIAL

BACKGROUND OF THE INVENTION

This is a continuation-in-part of U.S. application Ser. No. 08/312,227, filed Sep. 26, 1994 now U.S. Pat. No. 5,494,391.

The present invention is directed to method and device for repairing a hole in a vehicle tire. In the past, many methods and tools have been designed and used in attempt to repair automobile tires, but not too many of these tools remain on the market. Some of these were not easy to use, many of them were too complex and not economical. Additionally, many people can not use these tools or plugs to repair holes in tires, especially when traveling. The present invention provides an easy, quick, economic, and efficient method to repair a tire hole without the need of any special skills and without removing the tire from the wheel.

SUMMARY OF THE INVENTION

It is, therefore, an object of the present invention to provide a highly efficient method for repairing punctures or holes in a tire.

Another object of the present invention is to provide a very low cost device for repairing punctures in tires.

A more important object of the invention is to provide a very simple method for quickly repairing holes or punctures in tires without the need for any special repair skills.

A still further object of the invention is to provide an easy-to-use method for repairing punctures in tires which requires only one simple tool; namely, a screwdriver, unless the hole is in the concave portion of the tire, in which case a cutter tool is used to cut a shallow recess into which a sealing screw is inserted.

Generally speaking, the present invention provides a very convenient, economic method for repairing holes in vehicle tires, which method can be carried out by individuals without any previous experience in performing the method. The method can be performed even when traveling, without taking the tire off the car. All that is required is that the operator press a sealing screw into the puncture and put the sealing material around and inside a slot formed under the head of the sealing screw. If the hole, or puncture is on the convex of the tire, a cutter tool is used to cut a shallow hole so that the screw head will remain inside the tire without touching the ground. Then a screwdriver is used to drive the sealing screw into the hole and to tighten it.

The theory of the invention is based on the following:

As a physical theory, force F equals the pressure P time the area S; that is, $F=P*S$. When a sealing screw is placed in a hole in a tire, the leaking area between the screw and wall of the hole which is formed by the rubber of the tire is very small. Even if the pressure inside the tire is large, because of the very small area S, the resulting force is very small. A small piece of sealing material such as an adhesive rubber placed around the top of the leaking area is enough to seal it. The sealing screw includes a head which will press the sealing material into the hole, with the body of the sealing screw having a spiral thread which fixes the screw inside the tire hole so that even at high speed the head of the screw inside the tire hole still presses the sealing material around the hole without any leaking.

The tire is made of rubber. Accordingly, it is very easy to use a screwdriver to drive the sealing screw, which has a tapered body and convex spiral, with the sealing material into the hole. The hole can be easily expanded so that a limited number of sizes of sealing screws are sufficient to cover a number of different sizes of holes.

BRIEF DESCRIPTION OF THE DRAWINGS

The foregoing, and additional objects, features, and advantages of the present invention will be apparent from the following detailed description of a preferred embodiment thereof, taken in conjunction with the accompanying drawings, in which.

DESCRIPTION OF THE PREFERRED EMBODIMENT

Figure 1:
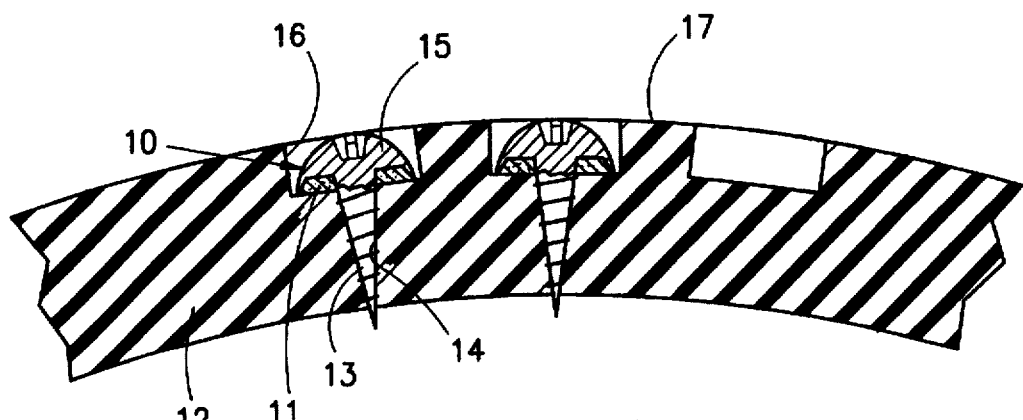
FIG. 1 is a partial cross-sectional view of a typical vehicle tire which has been repaired by the sealing screw and sealing material of the invention for holes in either the concave or convex surface of the tire.

Referring now to the drawings, there is illustrated in FIG. 1 a sealing screw 10 with a sealing material 11 located in a puncture, or hole in a vehicle tire 12 to seal the puncture and thus to repair the tire. The sealing material 11 is a sticky material such as adhesive rubber. As illustrated, a body portion 13 of the screw 10 is located inside a hole 14 in the tire 12, with a head portion 15 of the screw pressing the sealing material 11 around and into hole 14. On the concave portion of the tire; i.e., on the surface of the tire which engages the road surface, a shallow recess 16 is formed around and concentric with the top of the hole 14 so that the head 15 of the screw is recessed in the tire, and below its surface 17. The top surface of the head is rounded, as illustrated.

Figure 2A:
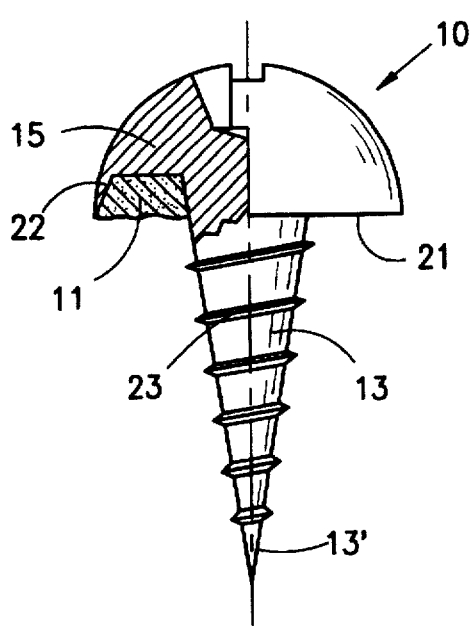
FIG. 2A is an enlarged side view of the sealing screw with the sealing material of FIG. 1.
Figure 2B:
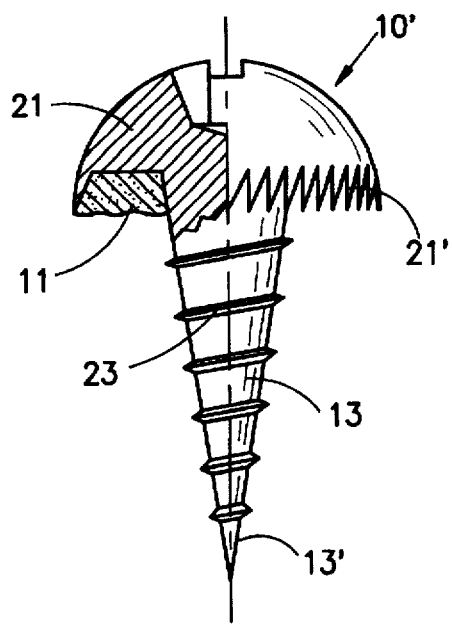
FIG. 2B is an enlarged side view of a modified form of the sealing screw of FIG. 1.

As illustrated in FIGS. 2A and 2B, the bottom of the sealing screw head portion 15 incorporates a concave slot 22 having an outer wall which joins the top surface of the screw head at a circumferential edge 21 and an inner wall which is a continuation of the body portion 13 of the screw. The slot 22 is annular and extends completely around the body portion 13, and holds the sealing material 11 beneath the screw head and against the upper end of the body portion 13. The body of the screw is tapered from the slot 22 downwardly and inwardly to a pointed tail portion 13', and includes a convex spiral or thread 23. The thread makes it easy to drive the sealing screw into the hole, using a screw driver, while the edge 21 cuts into the tire to hold the sealing material under the screw head.

FIG. 2B illustrates a modification of the screw of FIG. 2A in which the circumferential edge 21 of head portion 15 is serrated, as at 21', around the outer edge of slot 22 to provide an improved cutting edge on the screw for seating the screw in the rubber of the tire.

Figure 3:
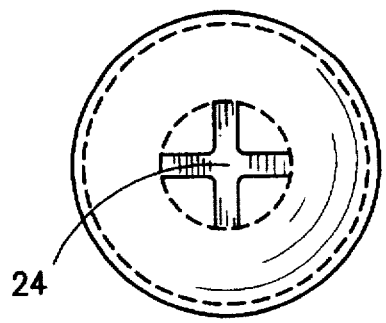
FIG. 3 is a top view of the device of FIGS. 2A or 2B.

FIG. 3, which is the top view of the sealing screw, shows a drive slot 24 which is engaged by a screw driver to drive the screw into the tire.

Figure 4:
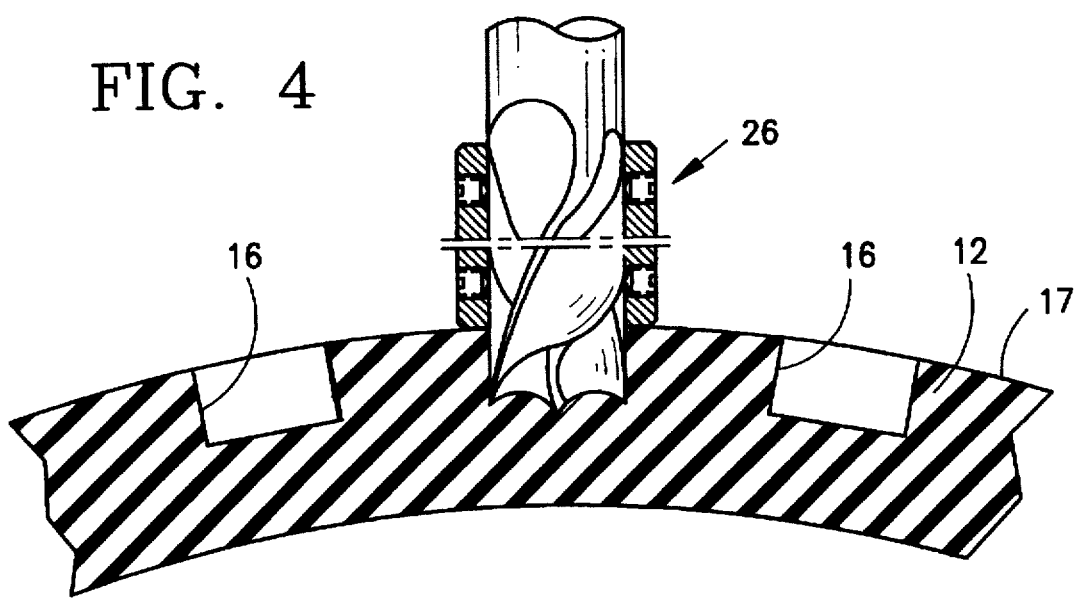
FIG. 4 is a side view in partial cross-section of a cutter tool for cutting a shallow hole on a tire face.
Figure 5:
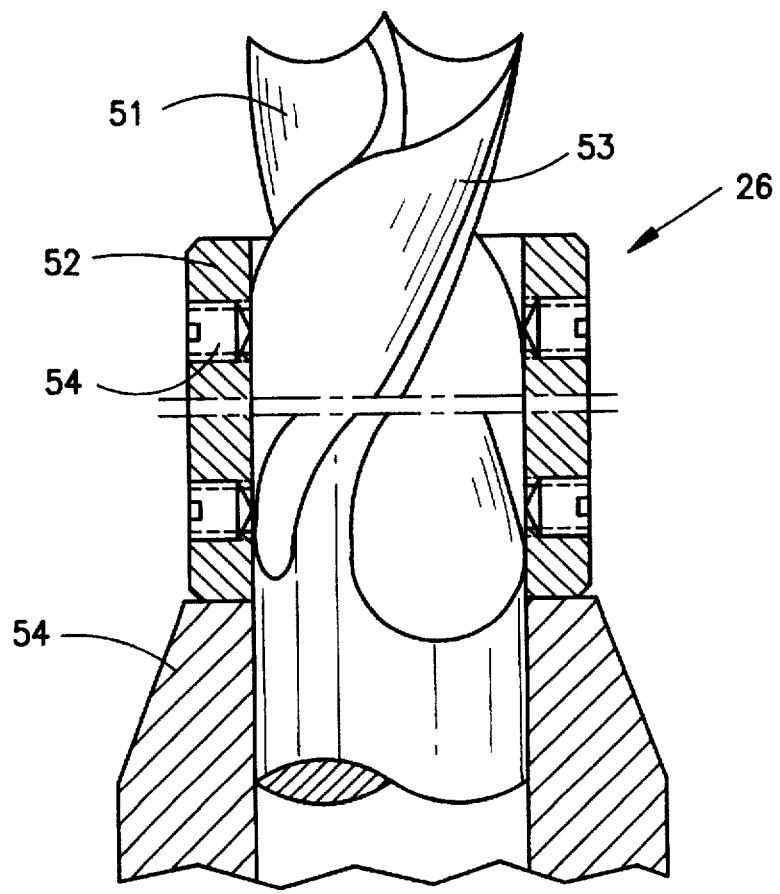
FIG. 5 is an enlarged view of the tool of FIG. 4.

FIG. 4 illustrates the use of a special cutter tool 26 to cut the rubber of tire 12 to form the shallow recess 16, illustrated in FIG. 1. As stated above, this recess is suitable for seating head portion 15 when the puncture 14 is on the convex surface 17 of the tire. As illustrated in FIG. 5, which is an enlarged view of the cutter tool 26, the tool includes a cutter tip 51. A limiter 52 is secured on the body 53 of the tool at a preselected distance from the tip 51 to prevent the user from driving the tip too deeply inside the tire. The limiter is adjustable, with screws 54 fixing the limiter at a desired location on the tool body 53. A chuck 55 holds the body 53 in a suitable handle for use in rotating the cutter to produce the shallow hole 16. The depth of the hole is determined by the position of limiter 52, as illustrated in FIG. 4.

I claim:

1. A screw-type closure for repairing a puncture in a vehicle tire, comprising:

a tapered body portion having an upper end with a first diameter and a lower end having a tapered point smaller than said first diameter, said body portion having a conical surface tapering inwardly and downwardly from said first diameter to said point;

a convex spiral thread on said conical surface of said body portion shaped to cut into a vehicle tire when the body portion is inserted into a puncture in a vehicle tire to thereby cause said conical surface to engage the vehicle tire around the puncture;

an enlarged head portion on, and concentric with, said upper end of said body portion, said head portion having an upper surface and a lower surface, said lower surface having a larger diameter than said first diameter;

a driving slot in said upper surface of said head portion for receiving a driving tool for rotatably driving said body portion to insert said body portion into the puncture;

an annular sealing slot in said lower surface of said head portion, said slot surrounding said upper end of said body portion and having an outer annular wall which cooperates with the upper surface of said head portion to provide a downwardly facing cutting edge round the outer circumference of and at the lower surface of said head portion; and an adhesive flexible rubber sealing material in said sealing slot and in contact with the walls of said slot, said adhesive material being driven into sealing contact with a tire surface surrounding a puncture upon insertion of the body portion into said puncture.

2. The closure of claim 1, wherein said cutting edge is serrated.

* * * * *